(12) United States Patent
Grange

(10) Patent No.: US 10,454,965 B1
(45) Date of Patent: Oct. 22, 2019

(54) DETECTING NETWORK PACKET INJECTION

(71) Applicant: Symantec Corporation, Mountain View, CA (US)

(72) Inventor: Waylon Grange, Lehi, UT (US)

(73) Assignee: Symantec Corporation, Mountain View, CA (US)

( * ) Notice: Subject to any disclaimer, the term of this patent is extended or adjusted under 35 U.S.C. 154(b) by 242 days.

(21) Appl. No.: 15/488,696

(22) Filed: Apr. 17, 2017

(51) Int. Cl.
  *H04L 29/06* (2006.01)

(52) U.S. Cl.
  CPC .......... H04L 63/1433 (2013.01); H04L 63/06 (2013.01); H04L 63/1416 (2013.01); H04L 63/1466 (2013.01); H04L 69/22 (2013.01)

(58) Field of Classification Search
  CPC . H04L 63/1433; H04L 63/06; H04L 63/1416; H04L 69/22; H04L 63/1466
  See application file for complete search history.

(56) References Cited

U.S. PATENT DOCUMENTS

| | | | | |
|---|---|---|---|---|
| 6,389,468 B1 * | 5/2002 | Muller | ................ | H04L 67/1002 709/226 |
| 7,500,264 B1 * | 3/2009 | Leavy | .................. | H04L 63/123 726/13 |
| 7,971,253 B1 * | 6/2011 | Gupta | ................. | H04L 63/1416 726/11 |
| 9,154,423 B1 * | 10/2015 | Szabo | .................. | H04W 28/02 |
| 10,158,657 B1 * | 12/2018 | Bray | ..................... | G06F 16/285 |
| 2003/0154399 A1 * | 8/2003 | Zuk | ..................... | H04L 63/0254 726/11 |
| 2004/0054925 A1 * | 3/2004 | Etheridge | ........... | H04L 63/1425 726/22 |
| 2004/0064737 A1 * | 4/2004 | Milliken | ............... | G06F 21/562 726/23 |
| 2005/0021999 A1 * | 1/2005 | Touitou | ............... | H04L 63/1458 726/11 |
| 2005/0182929 A1 * | 8/2005 | Kaniyar | .................. | H04L 9/002 713/164 |

(Continued)

OTHER PUBLICATIONS https://redmine.openinfosecfoundation.org/issues/603, by Victor Julien, Oct. 11, 2012.

(Continued)

*Primary Examiner* — Darren B Schwartz
(74) *Attorney, Agent, or Firm* — Holland & Hart LLP

(57) ABSTRACT

A method for preventing suspicious activity on a computer network is described. In one embodiment, the method includes determining a first identifier of a first packet from a connection associated with network traffic, calculating a first value based at least in part on a portion of data included in the first packet, determining a second identifier of a second packet from the connection associated with the network traffic, the second identifier matching the first identifier, calculating a second value based at least in part on a portion of data included in the second packet, comparing the first value with a the second value, and determining that suspicious activity is occurring on the network based at least in part on the comparison between the first and second values. In some embodiments, the first identifier includes at least one of a sequence number and an acknowledgement number associated with the first packet.

20 Claims, 8 Drawing Sheets

(56) References Cited

U.S. PATENT DOCUMENTS

| | | | | |
|---|---|---|---|---|
| 2006/0206615 A1* | 9/2006 | Zheng | H04L 63/0227 | 709/229 |
| 2007/0011734 A1* | 1/2007 | Balakrishnan | H04L 43/026 | 726/13 |
| 2007/0280106 A1* | 12/2007 | Lund | H04L 63/1408 | 370/230 |
| 2008/0141369 A1* | 6/2008 | Butti | H04L 63/1408 | 726/22 |
| 2008/0313708 A1* | 12/2008 | Khan | H04L 63/1408 | 726/3 |
| 2009/0323703 A1* | 12/2009 | Bragagnini | H04L 29/12009 | 370/401 |
| 2010/0088766 A1* | 4/2010 | Michaely | H04L 63/1441 | 726/23 |
| 2010/0278191 A1* | 11/2010 | Gupta | H04L 63/1458 | 370/419 |
| 2011/0138462 A1* | 6/2011 | Kim | H04L 63/0236 | 726/22 |
| 2012/0192272 A1* | 7/2012 | Hentunen | H04L 63/1416 | 726/23 |
| 2012/0254936 A1* | 10/2012 | Baek | H04L 47/20 | 726/1 |
| 2013/0152189 A1* | 6/2013 | Lee | H04L 63/1408 | 726/13 |
| 2014/0289840 A1* | 9/2014 | Jain | H04L 63/0245 | 726/13 |
| 2016/0191530 A1* | 6/2016 | Jain | H04L 63/101 | 726/4 |
| 2016/0261611 A1* | 9/2016 | Heilig | H04L 63/1425 | |
| 2017/0111390 A1* | 4/2017 | Frydman | H04L 63/1458 | |
| 2017/0250954 A1* | 8/2017 | Jain | H04L 63/0254 | |
| 2018/0270152 A1* | 9/2018 | Zhao | H04L 45/7453 | |

OTHER PUBLICATIONS https://www.bro.org/sphinx/scripts/base/bif/event.bif.bro.html#id-rexmit_inconsistency; The Bro Project, 2016.
https://honeybadger.readthedocs.io/en/latest/; David Stainton, 2015.
https://github.com/zond/qisniff; GitHub, Inc., 2017.
https://www.netresec.com/?page=findject; Netrese AB, 2010-2017.
http://www.netresec.com/?page=Blog&month=2016-10&post=Detect-TCP-content-injection-attacks-with-findject; Erik Hjelmvik, Oct. 25, 2016.
https://www.eff.org/wp/detecting-packet-injection; Seth Schoen, Nov. 27, 2007.
https://en.wikipedia.org/wiki/Packet_injection#Detecting_packet_injection; Wikipedia, Feb. 17, 2017.

* cited by examiner

DETECTING NETWORK PACKET INJECTION

BACKGROUND

The use of computer systems and computer-related technologies continues to increase at a rapid pace. This increased use of computer systems has influenced the advances made to computer-related technologies. Computer systems have increasingly become an integral part of the business world and the activities of individual consumers. Computer systems may be used to carry out several business, industry, and academic endeavors.

As technology in the home, work place, and public areas continues to develop, the ability to secure and protect user information has become more difficult. In particular, certain types of wireless communication are subject to man-in-the-middle (MITM) attacks that may impersonate valid connections with a device, gather and/or receive information relating to the device, and engage in harmful, hostile behavior to steal information. One example of this attack is transmission control protocol (TCP) content injection, that attacks Wi-Fi communications. Users of technology may be unaware of these attacks and as a result may unknowingly divulge secure information to those breaching the system. Thus, there exists needs in the art to develop systems and methods for preventing suspicious activity on a computer network.

SUMMARY

According to at least one embodiment, a method for preventing suspicious activity on a computer network is described. In some cases, the present systems and methods may leverage real-time traffic data to determine suspicious network activity in a network. In one embodiment, the method may include determining, via one or more processors, a first identifier of a first packet from a connection associated with network traffic, calculating, via the one or more processors, a first value based at least in part on a portion of data included in the first packet, determining, via the one or more processors, a second identifier of a second packet from the connection associated with the network traffic, the second identifier matching the first identifier, calculating, via the one or more processors, a second value based at least in part on a portion of data included in the second packet, comparing, via the one or more processors, the first value with a the second value, and determining, via the one or more processors, that suspicious activity is occurring on the network based at least in part on the comparison between the first and second values.

In some embodiments, the first identifier includes at least one of a sequence number and an acknowledgement number associated with the first packet. In some embodiments, the method may include determining that the first packet and the second packet are payload bearing packets based at least in part on a hash map associated with the connection, identifying a number of bytes of the data included in the first packet, and computing a cyclic redundancy check (CRC) value across the identified number of bytes. In some cases, the first value is based at least in part on the computed CRC value.

In some embodiments, the first identifier and the first value are identified based at least in part on the hash map. In some embodiments, the method may include detecting the suspicious network activity based at least in part on determining that the first identifier and the second identifier match, and the first value and the second value do not match.

In some embodiments, the method may include identifying an origin associated with the suspicious network traffic, and adjusting a rating associated with the identified origin based at least in part on the detecting.

In some cases, the network traffic includes at least one of packet flows between one or more devices of an intranet, packet flows between one or more devices of the Internet, or any combination thereof. In some cases, the first packet and/or the second packet include at least one of a transmission control protocol (TCP) packet, internet protocol (IP) packet, internet control message protocol (ICMP) packet, user datagram protocol (UDP) packet, or any combination thereof.

In some embodiments, the method may include performing a security action based at least in part on detecting the suspicious network activity. In some embodiments, the method may include terminating the connection based at least in part on detecting the suspicious network activity.

In some embodiments, the method may include detecting a termination of the connection associated with the suspicious network activity, and upon detecting the termination, storing to a storage drive data from the network traffic associated with the connection.

A computing device configured for preventing suspicious activity on a computer network is also described. The computing device may include one or more processors and memory in electronic communication with the one or more processors. The memory may store computer executable instructions that when executed by the one or more processors cause the one or more processors to perform the steps of determining a first identifier of a first packet from a connection associated with network traffic, calculating a first value based at least in part on a portion of data included in the first packet, determining a second identifier of a second packet from the connection associated with the network traffic, the second identifier matching the first identifier, calculating a second value based at least in part on a portion of data included in the second packet, comparing the first value with a the second value, and determining that suspicious activity is occurring on the network based at least in part on the comparison between the first and second values.

In some cases, the first identifier includes at least one of a sequence number and an acknowledgement number associated with the first packet. In some cases, the application may be configured to determine that the first packet and the second packet are payload bearing packets based at least in part on a hash map associated with the connection, identify a number of bytes of the data included in the first packet, and compute a CRC value across the identified number of bytes. In some cases, the first value may be based at least in part on the computed CRC value.

In some cases, the first identifier and the first value are identified based at least in part on the hash map. In some cases, the first identifier is stored as a key of a key-value pair in the hash map, and the first value is stored as a value of the key-value pair in the hash map.

A non-transitory computer-readable storage medium storing computer executable instructions is also described. When the instructions are executed by one or more processors, the execution of the instructions may cause the one or more processors to perform the steps of determining a first identifier of a first packet from a connection associated with network traffic, calculating a first value based at least in part on a portion of data included in the first packet, determining a second identifier of a second packet from the connection associated with the network traffic, the second identifier matching the first identifier, calculating a second value based at least in part on a portion of data included in the second packet, comparing the first value with a the second value, and determining that suspicious activity is occurring on the network based at least in part on the comparison between the first and second values.

In some cases, the first identifier includes at least one of a sequence number and an acknowledgement number associated with the first packet. In some cases, the application may be configured to determine that the first packet and the second packet are payload bearing packets based at least in part on a hash map associated with the connection, identify a number of bytes of the data included in the first packet, and compute a CRC value across the identified number of bytes. In some cases, the first value may be based at least in part on the computed CRC value.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
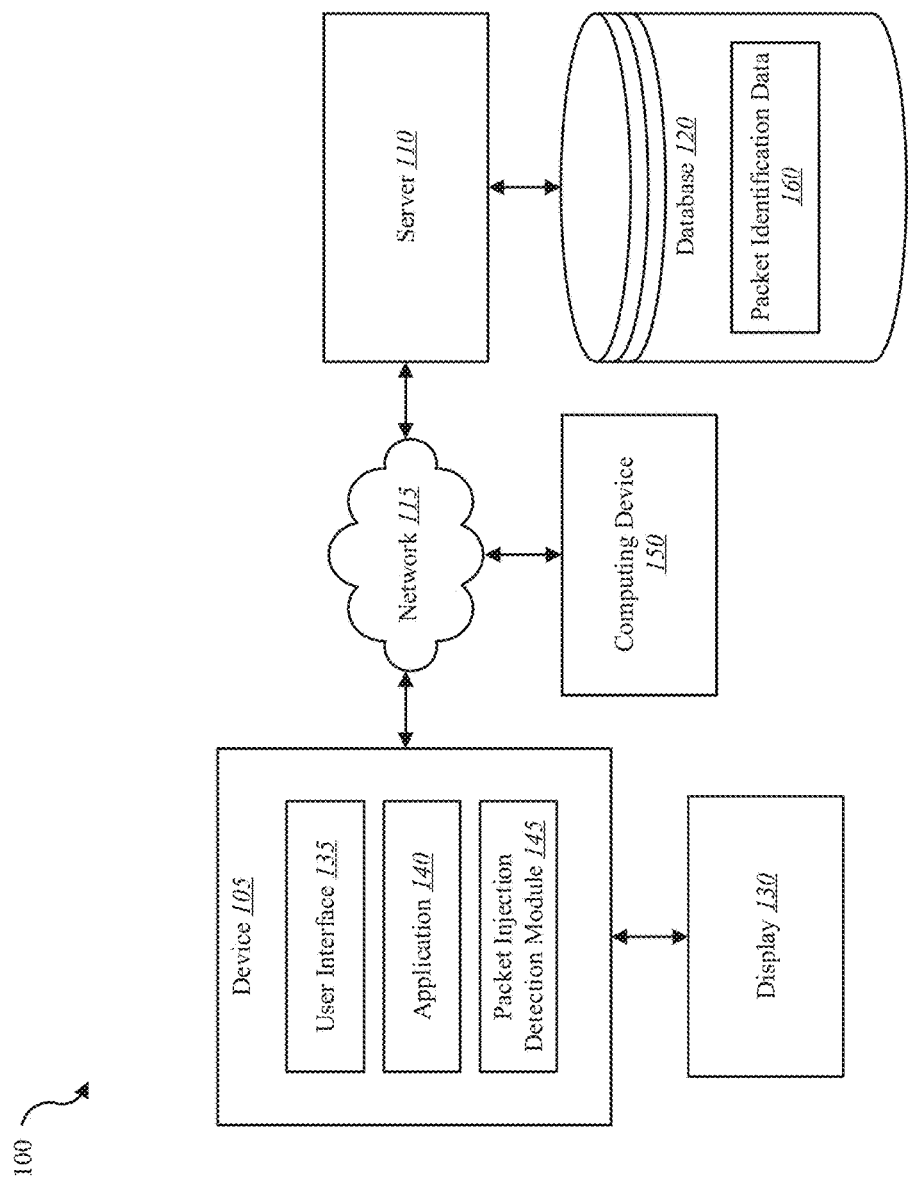
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to detecting network packet injection. More specifically, the systems and methods described herein relate to leveraging real-time traffic data to efficiently detect TCP content injection.

Packet injection is a computer networking term that refers to the process of interfering with an established network connection. Packet injection may be performed by constructing packets to appear as if they are part of the normal communication stream. Packet injection is also known as forging packets or spoofing packets. The packet injection process allows an unknown third party to disrupt or intercept packets from the consenting parties that are communicating. Often times, these attacks are initiated by a malicious user. Packet injection is commonly used in man-in-the-middle type attacks and denial-of-service attacks.

Computer users are increasingly using various applications such as web based applications, cloud storage applications, and the like, to perform tasks that have typically been performed and stored on a local computer. Therefore, there has been an increase in traffic within a network. This in turn has also increased a chance of packet injection attacks. During an established TCP connection between a server and a client, it is beneficial to identify when an attacker is trying to inject packets. Existing solutions detect TCP injection using a buffer methodology. All packets are reassembled, and overlapping packets are marked as potential threats. However, the buffer method is resource intensive and time intensive.

Some internet service providers (ISPs), governments, and others are seeing an injecting of network packets into network connections to alter, deny, or completely replace the original content of data packets. To find these attacks, the present systems and methods detect CP packet injection on any connection. The present systems and methods monitor multiple network connections in real time. In some cases, the present systems and methods may implement a real-time rating engine to rate network connections without incurring a performance penalty on associated systems. The present systems and methods may use a data verification algorithm on a subset of the content at sequence number offsets to detect duplicate packets with different content. In one embodiment, finding different content for the same sequence number suggests an injection attack is occurring.

The present systems and methods monitor connections and traffic between a client system and a server by running at either end and/or in between the client and server such as at an intermediate network device, a gateway, an intrusion detection system, etc. For each connection made between systems (e.g., between a client and a server, etc.) the present systems and methods may inspect all payload bearing packets and compute a CRC for a portion of the payload then map that value to the packets order in the connection. Subsequently, when a different hash is found for the same packet ordering within the same connection then an attempted injection attack is assumed to be found.

The real-time packet injection detection method includes asynchronously monitoring network connections between a client and a server machine. This can be implemented on either of the two endpoints or in a position in-between which is capable of collecting traffic from both sides. The system monitors all network packets to and from a system and groups them by connection. For each connection between a client and server the system keeps a map of all packets that contain content beyond the header and options, which may be referred to as payload bearing packets. These payload bearing packets are identified in the map by their sequence number. Upon completion of the connection this hash map may be discarded. For each payload bearing packet a CRC value may be computed across the first X bytes of the payload. In some embodiments, the value of X may be a fixed number. In some cases, the value of X may be constrained to be smaller than the minimum expected maximum transmission unit (MTU) value of a given connection or transmission. In some embodiments, the CRC value may then be inserted in the hash map. If there is already a CRC value for the given sequence number which is different than the new CRC value, then it is assumed a packet injection attack has occurred.

Systems and methods are described in which a TCP detection device may be placed at an ingress point of real-time traffic, at an egress point of real-time traffic, or at any point with visibility of the real-time traffic. In some cases, the present systems and methods may monitor all packets in an established connection. For example, the systems and methods may detect that a TCP connection established between a client and a server. The systems and methods may detect whether a monitored packet is a payload bearing packet. If the monitored packet is a payload bearing packet, then the systems and methods may determine an identifier for the payload bearing packet. The identifier may be determined using a sequence number and an acknowledgement number of the packet. The systems and methods may also determine a data value of the packet. The data value may be determined by computing a CRC value across a number of bytes of the payload. For each connection between a client and server, the systems and methods may keep a map of all TCP packets that contain content beyond the header. The systems and methods may be configured to store the identifier and the data value of each TCP packet, as a key-value pair in a hash map.

Upon receiving a new TCP packet, the systems and methods may be configured to determine an identifier and a data value of the new TCP packet. If the identifier already exists in the hash map, then the systems and methods may be configured to compare the data values of the existing TCP packet, and the new TCP packet. If the data values match with each other, then the TCP packet is marked as retransmission. If the data values do not match with each other, then a TCP packet injection may be detected.

For each established connection, the systems and methods may keep the monitored TCP packets in memory until the session concludes. If a TCP content injection is detected, then the all packets are stored to a storage disk. If no suspicious activity is detected, then the packets are removed from memory, once the established session concludes.

Benefits of the present systems and methods include detecting TCP content injection in real-time traffic. For example, TCP inject attacks can be detected in real-time without having to incur a performance penalty. The method for detecting TCP content injection may be utilized in IPS, next generation firewall, and web proxy space.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, a display 130, a computing device 150, and a network 115 that allows the device 105, the server 110, and the computing device 150 to communicate with one another.

Examples of the device 105 may include any combination of networking devices, mobile devices, smart phones, personal computing devices, computers, laptops, desktops, servers, media content set top boxes, or any combination thereof. Further examples of device 105 may include at least one of a network router, a wired router, a wireless router, network interface controller, wireless network interface controller, a modem, network bridge, network hub, network switch, a multilayer switch, a gateway, a bridge router, a multiplexor, a repeater, a firewall, a proxy server, or any combination thereof.

Examples of computing device 150 may include any combination of a mobile computing device, a laptop, a desktop, a server, a media set top box, or any combination thereof. Examples of server 110 may include at least one of a cloud application server, a remote cloud storage server, a data server, a cloud server, a server associated with an automation service provider, proxy server, mail server, web server, application server, database server, communications server, file server, home server, mobile server, name server, or any combination thereof.

In some configurations, the device 105 may include a user interface 135, application 140, and packet injection detection module 145. Although the components of the device 105 are depicted as being internal to the device 105, it is understood that one or more of the components may be external to the device 105 and connect to device 105 through wired and/or wireless connections. In some embodiments, application 140 may be installed on computing device 150 in order to allow a user to interface with a function of device 105, packet injection detection module 145, and/or server 110. In some cases, application 140 may include a software application such as an online application accessed via a web browser, a cloud based application, a web based application, a mobile application configured to access the Internet, a desktop application configured to access the Internet, or any combination thereof. In some cases, application 140 may be installed on an external device (not shown) connected to the device 150, and may allow a user to interface with a function of device 105, packet injection detection module 145, and/or server 110.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include a packet injection detection module 145. For example, device 105 may include application 140 that allows device 105 to interface with an external machine via packet injection detection module 145 located on another device such as computing device 150 and/or server 110. In some embodiments, device 105, and server 110 may include a packet injection detection module 145 where at least a portion of the functions of packet injection detection module 145 are performed separately and/or concurrently on device 105, and/or server 110. Likewise, in some embodiments, a user may access the functions of device 105 (directly or through device 105 via packet injection detection module 145) from computing device 150. For example, in some embodiments, computing device 150 includes a mobile application that interfaces with one or more functions of device 105, packet injection detection module 145, and/or server 110.

In some embodiments, server 110 may be coupled to database 120. Database 120 may be internal or external to the server 110. In one example, device 105 may be coupled directly to database 120, database 120 being internal or external to device 105. Database 120 may include packet identification data 160. For example, server 110 may identify conjunction with device 105, a key-value pair associated with a particular packet. Upon identifying the key-value pair, server 110 may store the key-value pair in the packet identification data 160.

Packet injection detection module 145 may enable a computing device to identify a first identifier of a first packet from a connection associated with network, identify a context associated with the suspicious network traffic, calculate a first value based at least in part on a portion of data included in the first packet, identify a second identifier of a second packet from the connection associated with the network traffic, calculate a second value based at least in part on a portion of data included in the second packet, upon determining the first identifier matches the second identifier, compare the first value with a the second value, and detect the first value with a the second value. In some embodiments, packet injection detection module 145 may be configured to perform the systems and methods described herein in conjunction with user interface 135 and application 140. User interface 135 may enable a user to interact with, control, and/or program one or more functions of packet injection detection module 145. Further details regarding the packet injection detection module 145 are discussed below.

Figure 2:
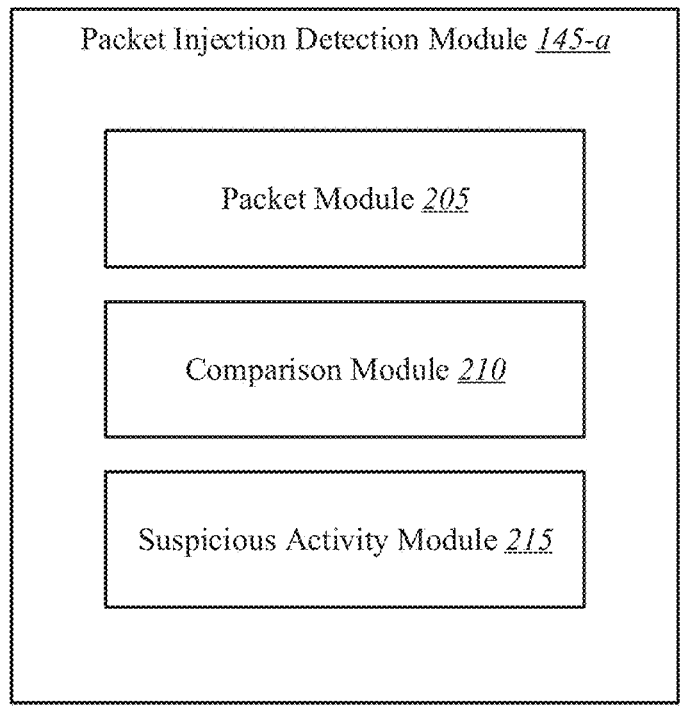
FIG. 2 is a block diagram illustrating one example of a packet injection detection module.

FIG. 2 is a block diagram illustrating one example of a packet injection detection module 145-a. Packet injection detection module 145-a may be one example of packet injection detection module 145 depicted in FIG. 1. As depicted, packet injection detection module 145-a may include packet module 205, comparison module 210, and suspicious activity module 215.

In some embodiments, at least a portion of packet injection detection module 145 may be implemented in an application on a local machine (e.g., device 105 of FIG. 1), a remote computing device (e.g., computing device 150 of FIG. 1), a network device (e.g., network 115 of FIG. 1), a server (e.g., server 110 of FIG. 1), or any combination thereof.

In one embodiment, packet module 205 may be configured to monitor real-time network traffic in a network. As one example, packet module 205 may monitor network traffic at an ingress point and at an egress point, of the network. In some examples, packet module 205 may be configured to monitor a mix of traffic from an intranet and traffic from the Internet. In some examples, packet module 205 may receive network traffic that includes packet flows between one or more devices of an intranet. In some examples, packet module 205 may receive packet flows between one or more devices of the Internet.

In some cases, packet module 205 may receive a first packet from a connection associated with network traffic. In one example, packet module 205 may classify one or more applications from the received packet. In some examples, packet module 205 may identify one or more ports used for receiving network traffic. In some embodiments, packet module 205 may be configured to receive the real-time traffic over network 115, as described with reference to FIG. 1. In some examples, packet module 205 may be configured to identify that the network traffic includes at least one of a TCP packet, internet protocol (IP) packet, internet control message protocol (ICMP) packet, user datagram protocol (UDP) packet, or any combination thereof. In some cases, packet module 205 may identify that the received first packet is a TCP packet. In one embodiment, packet module 205 may be configured to identify a context associated with an established connection. In some examples, packet module 205 may identify a user account associated with the established connection, as the context.

In some embodiments, packet module 205 may be configured to identify a hypertext transfer protocol (HTTP) or a secure HTTP protocol. In one example, packet module 205 may identify when an HTTP session is established, and may monitor the first packet of the established HTTP session. In some examples, packet module 205 may monitor a predetermined number of packets in each connection. In some cases, packet module 205 may inspect each packet in a connection to identify whether the packet is a payload bearing packet.

In some embodiments, packet module 205 may be configured to determine whether a received packet is a payload bearing packet based at least in part on a hash map associated with a connection. In some examples, packet module 205 may generate a new hash map for each connection in a network. In some cases, packet module 205 may maintain multiple hash maps for a single connection. In some other embodiments, packet module 205 may maintain one hash map for multiple connections. Upon determining that a packet is a payload bearing packet, in some examples, packet module 205 may generate an identifier associated with the packet. For example, the identifier of the packet may include a sequence number and an acknowledgement number associated with the received packet. In some examples, packet module 205 may store the identifier in a hash map associated with a connection. In some embodiments, packet module 205 may transmit the hash map to be stored in database 120, as described with reference to FIG. 1.

In some examples, packet module 205 may determine a value associated with the packet. In some embodiments, packet module 205 may identify a number of bytes of data included in the packet. In some cases, the number of bytes of data may be pre-determined. In some cases, the number of bytes may be smaller than the smallest packet size of the established connection. In some examples, packet module 205 may determine the value of the packet based on the number of bytes. For example, packet module 205 may compute a CRC value of the identified number of bytes, and may determine the value of the received packet based on the computed CRC value. In some examples, packet module 205 may store the value in the hash map associated with a connection. In some embodiments, packet module 205 may transmit the value in the hash map to be stored in database 120, as described with reference to FIG. 1.

In some embodiments, packet module 205 may be configured to receive a second packet. Upon receiving the second packet, packet module 205 may be configured to determine whether the second packet is a payload bearing packet. For example, packet module 205 may identify data portion of the packet to identify whether the received packet includes data. Upon determining that the second packet is a payload bearing packet, in some embodiments, packet module 205 may generate a second identifier associated with the second packet. For example, the second identifier of the second packet may include a sequence number and an acknowledgement number associated with the second packet. In some examples, the second packet may be received by packet module 205 at a time later than the first packet. In some examples, packet module 205 may determine whether the second identifier exists in a hash map. For example, packet module 205 may identify if an identifier already exists in a hash map, that matches with the second identifier. If a matching identifier does not exist, then packet module 205 may store the second identifier in the hash map. In some embodiments, packet module 205 may transmit the hash map to be stored in database 120, as described with reference to FIG. 1. If a matching identifier exists in the hash map, in some examples, packet module 205 may determine a second value associated with the second packet.

In some embodiments, packet module 205 may identify a number of bytes of data included in the second packet. In some cases, the number of bytes of data may be predetermined. In some cases, the number of bytes may be smaller than the smallest packet size of the established connection. In some examples, the number of bytes used to determine a first value for the first packet may be different from the number of bytes used to determine a second value for the second packet. In some examples, packet module 205 may determine the second value of the second packet based on the number of bytes. For example, packet module 205 may compute a CRC value of the identified number of bytes, and may determine the second value of the second packet based on the computed CRC value. If the second packet (i.e., the packet received at a later time) is different from the first packet (i.e., the packet received prior to the second packet), then packet module 205 may store the second value in the hash map associated with the connection. For example, packet module 205 may store the second value in the same hash map as the first value. If the identifier of the second packet (i.e., the packet received at a later time) is same as the identifier of the first packet (i.e., the packet received prior to the second packet), then packet module 205 may send the second value to comparison module 210.

In some embodiments, comparison module 210 may be configured to receive a first identifier from a first connection associated with network traffic. In some examples, comparison module 210 may receive the first identifier from packet module 205. In some examples, comparison module 210 may be configured to retrieve the first identifier stored in a hash map. In some embodiments, comparison module 210 may be configured to receive a first value associated with the first packet. In some examples, the first value may be based at least in part on a portion of data included in the first packet. In some examples, comparison module 210 may receive the first value from packet module 205. In some examples, comparison module 210 may be configured to retrieve the first value stored in the hash map. For example, comparison module 210 may be configured to retrieve the hash map from database 120, as described with reference to FIG. 1.

In some examples, comparison module 210 may receive an indication that a second packet is received at packet module 205. In some embodiments, comparison module 210 may be configured to receive a second identifier from a second connection associated with network traffic. In some examples, comparison module 210 may receive the second identifier from packet module 205. In some examples, comparison module 210 may receive an indication from packet module 205, that the first identifier and the second identifier are similar. In some embodiments, comparison module 210 may be configured to receive a second value associated with the second packet. In some examples, the second value may be based at least in part on a portion of data included in the second packet. In some examples, packet module 205 may retrieve the portion of data from the second packet, and may determine the second value based at least in part on the data. Upon determining the second value, packet module 205 may be configured to indicate the second value to comparison module 210. In some examples, comparison module 210 may be configured to compare the first value with the second value. For example, comparison module 210 may be configured to determine whether the first value is same as the second value, based at least in part on the comparison. If the first identifier matches with the second identifier, and the first value do not match with the second value, then comparison module 210 may be configured to detect a suspicious network activity.

In one embodiment, suspicious activity module 215 may be configured to detect suspicious network activity based at least in part on the comparison. For example, suspicious activity module 215 may detect a suspicious network activity upon receiving an indication that two packets have same identifiers but different values. In some examples, suspicious activity module 215 may categorize the suspicious network activity as TCP content injection.

In some examples, suspicious activity module 215 may identify one or more characteristics related to one or more suspicious packets in the network traffic. In some examples, suspicious activity module 215 may identify one or more characteristics related to a top talker and a top listener within a network. In some examples, suspicious activity module 215 may be configured to track a time of a connection established by an IP address. In some examples, suspicious activity module 215 may identify a frequency of connection between a computing device and one or more peers.

In some examples, suspicious activity module 215 may identify one or more applications from the monitored real-time traffic. For example, suspicious activity module 215 may identify an application associated with an established connection. In some examples, suspicious activity module 215 may detect a suspicious event upon identifying an unsafe application. In some embodiments, suspicious activity module 215 may be configured to analyze the packets associated with a connection, for a predefined time period. As an example, suspicious activity module 215 may analyze the packets associated with the connection for a week. In one embodiment, suspicious activity module 215 may be configured to identify a packet flow associated with a particular computing device (e.g., client machine). For example, suspicious activity module 215 may identify one or more packet flows from device 105 of FIG. 1, one or more packet flows from computing device 150 of FIG. 1, and/or one or more packet flows from server 110 of FIG. 1.

Additionally, or alternatively, suspicious activity module 215 may be configured to determine a pattern associated with the network traffic. In some examples, suspicious activity module 215 may identify a network usage pattern for each computing device based at least in part on their IP number. In some examples, suspicious activity module 215 may analyze a pattern of traffic between a server and a client. In some examples, suspicious activity module 215 identify an origin associated with suspicious network traffic. For example, suspicious activity module 215 may identify an IP number associated with the suspicious traffic. In some examples, suspicious activity module 215 may identify a type of security attack. The type of security attack may be determined based on an analysis of packets.

In some embodiments, suspicious activity module 215 may be configured to detect the suspicious network traffic based at least in part on the determined pattern. In some cases, suspicious activity module 215 may detect a suspicious event based on packet flow such as a TCP flow of a client machine or end point. In some cases, suspicious activity module 215 may identify a category associated with each packet in a first plurality of packet flows. In some embodiments, suspicious activity module 215 may detect suspicious network activity based on comparing a first identifier to a second identifier and a first value to a second value. In some examples, suspicious activity module 215 may determine whether a TCP packet injection has occurred in the established connection.

In some embodiments, suspicious activity module 215 may be configured to generate a rating associated with an identified origin. Upon detecting suspicious network traffic in an established connection, suspicious activity module 215 may tag the origin of the established connection, as a suspicious origin. In some examples, suspicious activity module 215 may adjust a rating associated with the suspicious origin based at least in part on detecting the suspicious network traffic. In some examples, suspicious activity module 215 may be configured to terminate a connection based at least in part on detecting suspicious network activity. In some examples, suspicious activity module 215 may not terminate the established connection, and may monitor for a termination of the connection. In some examples, suspicious activity module 215 may store every packet exchanged between a server and a client, during the connection. In some embodiments, suspicious activity module 215 may store the data to a storage device.

Figure 3:
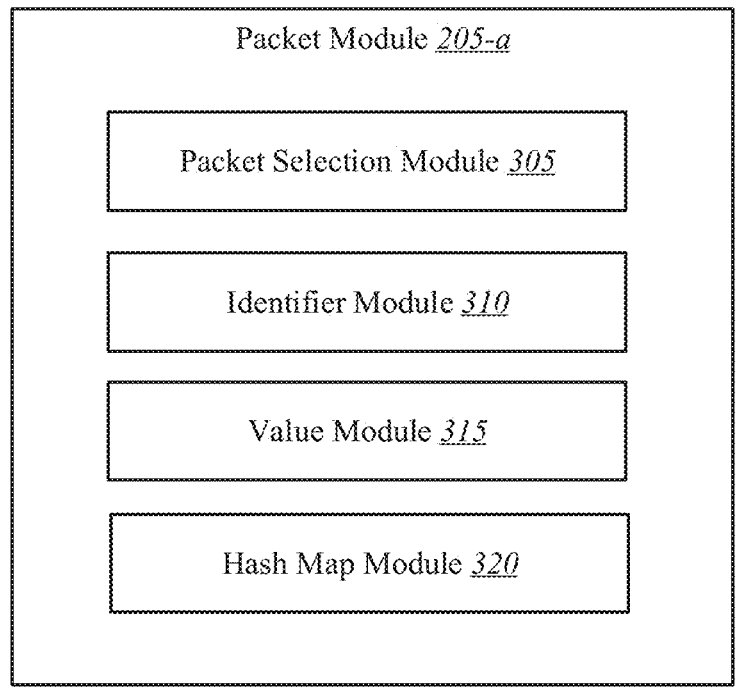
FIG. 3 is a block diagram illustrating one example of a packet module.

FIG. 3 is a block diagram illustrating one example of a packet module 205-*a*. The packet module 205-*a* may be an example of packet module 205 from FIG. 2. As depicted, packet module 205-*a* may include packet selection module 305, identifier module 310, value module 315, and hash map module 320.

In some embodiments, at least a portion of packet module 205-*a* may be implemented in an application on a local machine (e.g., device 105 of FIG. 1), a remote computing device (e.g., computing device 150 of FIG. 1), a network device (e.g., network 115 of FIG. 1), a server (e.g., server 110 of FIG. 1), or any combination thereof.

In one embodiment, packet selection module 305 may be configured to monitor traffic in a network. As one example, packet selection module 305 may monitor real-time traffic at an ingress point of the network. In some examples, packet selection module 305 may monitor real-time traffic at an egress point of the network. In one embodiment, packet selection module 305 may be configured to monitor traffic from an intranet and traffic from the Internet. In some examples, packet selection module 305 may receive multiple packets from an established connection. In some examples, packet selection module 305 may receive network traffic that includes packet flows between one or more devices of an intranet. In some examples, packet selection module 305 may receive packet flows between one or more devices of the Internet. In some examples, packet selection module 305 may be configured to identify that the network traffic includes at least one of a TCP packet, IP packet, ICMP packet, UDP packet, or any combination thereof. Packet selection module 305 may monitor each received packet to identify a type of the received packet. In one example, packet selection module 305 may identify the received packet as a TCP packet.

In some embodiments, packet selection module 305 may be configured to identify a HTTP or a secure HTTP protocol. In one example, packet selection module 305 may identify when an HTTP session is established, and may monitor the first packet of the established HTTP session. For example, packet selection module 305 may identify a request for an HTTP connection and may identify a response received from the connection. In some examples, packet selection module 305 may monitor a pre-determined number of packets in each connection. For example, packet selection module 305 may monitor every other packet in a connection. In some cases, packet selection module 305 may inspect each packet in a connection to identify whether the packet is a payload bearing packet. In some cases packet selection module 305 may receive a first packet from a connection associated with network traffic. In some embodiments, packet selection module 305 may be configured to receive the real-time traffic over network 115, as described with reference to FIG. 1.

In some embodiments, packet selection module 305 may be configured to determine whether a received packet is a payload bearing packet. In some cases, packet selection module 305 may determine that the received packet is a payload bearing packet based at least in part on a hash map associated with a connection.

Upon determining that a packet is a payload bearing packet, in some examples, identifier module 310 may identify a first identifier of a first packet from a connection associated with network traffic. In some examples, identifier module 310 may determine that the received packet consists of a segment header and a data section. In some examples, the header may contains 10 mandatory fields, and an optional extension field. In some examples, the data section of a TCP packet follows a header section. A header may include information about a source port of the packet, a destination port of the packet, a sequence number, an acknowledgement number, a data offset, reserved bits, window size, checksum, urgent pointer, and options field. The sequence number of a TCP packet indicates the sequence number of the packet in the established connection. In some examples, the sequence number may include a flag value. In some cases, the flag value may be set to either 0 or 1. Typically, the sequence number may comprise of 32 bits in a header of a TCP packet. In some examples, the acknowledgement number may comprise of an ACK flag. In some cases, the acknowledgement number may comprise of 32 bits. In some embodiments, upon receiving a packet, identifier module 310 may determine an identifier based at least in part on a sequence number and an acknowledgement number of the received packet. For example, identifier module 310 may perform a logical operation on 32 bits of the sequence number and 32 bits of the acknowledgement number, to generate the identifier. In some examples, an identifier may be able to uniquely identify a particular TCP packet. In some examples, identifier module 310 may send the identifiers to hash map module 320.

In some embodiments, identifier module 310 may be configured to receive a second packet. The second packet may be different from the first packet. Upon receiving the second packet, identifier module 310 may be configured to determine whether the second packet is a payload bearing packet. For example, identifier module 310 may identify that the second packet is a TCP payload bearing packet. In some examples, identifier module 310 may be configured to determine a header portion of the second packet and a data portion of the second packet. In some embodiments, identifier module 310 may generate a second identifier associated with the second packet. Identifier module 310 may determine the identifier using methods described above. In some examples, the second packet may be received by identifier module 310 at a time later than the first packet. In some examples, identifier module 310 may determine whether the second identifier already exists. For example, upon determining the second identifier, identifier module 310 may transmit a query to hash map module 320 to determine if the second identifier already exists in a hash map. In some examples, identifier module 310 may identify that the second identifier matches with a previously determined identifier. For example, the previously determined identifier may be identified from a previously received packet. If a matching identifier does not exist, then identifier module 310 may send the second identifier to hash map module 320.

In some embodiments, value module 315 may determine a value associated with the received packet. In some examples, value module 315 may calculate the first value based at least in part on a portion of data included in the received packet. In some embodiments, value module 315 may identify a number of bytes of data included in the packet. Value module 315 may receive an indication of an established connection, from packet selection module 305. In some examples, the data transfer is associated with the sequence number of the packet. In some cases, value module 315 may select one or more bytes of data from the data portion of a received packet. In some cases, the one or more number of bytes may be pre-determined. In some cases, the number of bytes may be smaller than the smallest packet size of the established connection. In some examples, value module 315 may determine the value of the packet based on the number of bytes. For example, value module 315 may compute a CRC value of the identified number of bytes, and may determine the value of the received packet based on the computed CRC value. In some examples, value module 315 may compute a different value for the identified number of bytes in the data portion of the received packet. In some examples, value module 315 may identify a fixed bit-pattern in the data portion of the received packet, and may determine a value based at least in part on the fixed bit pattern. In some examples, packet module 205 may send the value to hash map module 320, be stored in a hash map.

In some embodiments, value module 315 may determine a second value associated with the second packet. In some examples, value module 315 may calculate the second value based at least in part on a portion of data included in the second packet. In some embodiments, In some cases, the number of bytes may be smaller than the smallest packet size of the established connection. Value module 315 may select one or more bytes of data from the data portion of the second packet. In some examples, the number of bytes used to determine a first value for the first packet may be different from the number of bytes used to determine the second value for the second packet. In some examples, value module 315 may compute a CRC value of the identified number of bytes, and may determine the second value of the second packet based on the computed CRC value. In some examples, value module 315 may identify a fixed bit-pattern in the data portion of the second packet, and may determine a value based at least in part on the fixed bit pattern. In some examples, value module 315 may determine if the value associated with a first packet is different from the value associated with a second packet. In some embodiments, value module 315 may receive an indication from identifier module 310, if the a first indicator associated with a first packet is different from a second indicator associated with a second packet. If the two indicators are different, then value module 315 may not query hash map module 320 for a value associated with the second packet. Instead, value module 315 may send the second value of the second packet to hash map module 320. For example, if the second packet (i.e., the packet received at a later time) is different from the first packet (i.e., the packet received prior to the second packet), then value module 315 may send the second value to hash map module 320.

In some embodiments, hash map module 320 may receive a first identifier associated with a first packet and a first value associated with the first packet. The first identifier may be determined by identifier module 310 using methods described above. The first value may be determined by value module 315 using methods described above. In some embodiments, hash map module 320 may store the first identifier as a key of a key-value pair in a hash map, and the first value as a value of the key-value pair in the hash map. The hash map may be implemented as a data structure that maps keys to values. The hash map may use a hash function to compute an indexing of keys and values. In some examples, hash map module 320 may use a hash function to store the identifiers and the values in a hash table. In one example, hash map module 320 may maintain a hash table for an established connection. In some examples, hash map module 320 may generate a new hash map for each connection in a network. In some cases, hash map module 320 may maintain multiple hash maps for a single connection. In some other embodiments, hash map module 320 may maintain one hash map for multiple connections. In some examples, hash map module 320 may determine if the key of one key-value pair is same as the key from a second key-value pair. For example, if the identifier of the second packet (i.e., the packet received at a later time) is same as the identifier of the first packet (i.e., the packet received prior to the second packet), then hash map module 320 may send the second value to comparison module 210, as described with reference to FIG. 2.

Figure 4:
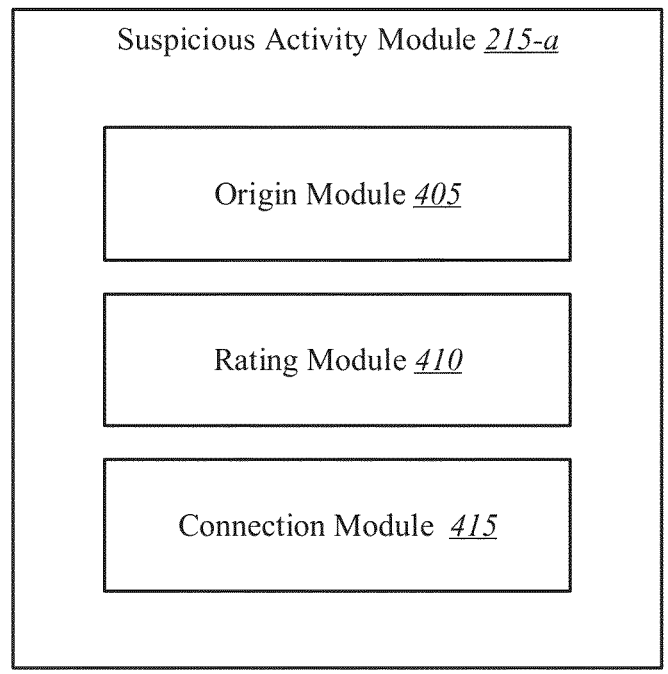
FIG. 4 is a block diagram illustrating one example of a suspicious activity module.

FIG. 4 is a block diagram illustrating one example of a suspicious activity module 215-*a*. The suspicious activity module 215-*a* may be an example of suspicious activity module 215 from FIG. 2. As depicted, suspicious activity module 215-*a* may include origin module 405, rating module 410, and connection module 415.

In some embodiments, at least a portion of suspicious activity module 215-*a* may be implemented in an application on a local machine (e.g., device 105 of FIG. 1), a remote computing device (e.g., computing device 150 of FIG. 1), a network device (e.g., network 115 of FIG. 1), a server (e.g., server 110 of FIG. 1), or any combination thereof.

In some embodiments, origin module 405 may detect suspicious network activity based on comparing a first identifier to a second identifier and a first value to a second value. In some examples, origin module 405 may identify an origin associated with the suspicious network traffic. For example, origin module 405 may determine a host of an application. Origin module 405 may monitor an established connection between a device and a website. In some examples, origin module 405 may determine that a TCP packet injection has occurred in the established connection. The TCP packet injection may be one example of suspicious network traffic detection. Upon detecting the suspicious network traffic, origin module 405 may identify the website as the origin of the suspicious network traffic.

In some embodiments, origin module 405 may be configured to analyze the network traffic for a predefined time period. As an example, origin module 405 may analyze the real-time traffic data for a day or a week or a month. In some examples, origin module 405 may only analyze traffic of a currently established connection. In some cases, origin module 405 may identify a category associated with an established connection. For example, origin module 405 may determine a name of a hosting website associated with the established connection. In some embodiments, origin module 405 may be configured to determine at least one application associated with each packet in the first plurality of packet flows. For example, origin module 405 may determine that a packet is associated with a cloud based application (e.g., cloud word processing application, etc.) or origin module 405 may determine that the packet is associated with a media application (e.g., online video streaming service). In some embodiments, origin module 405 may identify a user identifier associated with the application. In some examples, origin module 405 may perform a security action based at least in part on detecting suspicious network activity.

In some embodiments, rating module 410 may be configured to generate a rating associated with an identified origin. For example, rating module 410 may receive information relating to the origin from origin module 405. In some examples, rating module 410 may receive an indication if suspicious network traffic exists in a connection established by an origin. If suspicious network traffic exists in the connection, then rating module 410 may tag the origin as suspicious origin. In some examples, rating module 410 may adjust a rating associated with the suspicious origin based at least in part on detecting the suspicious network traffic. In some examples, if a rating of an application (or a website) falls below a certain threshold, then additional verification may be requested at the time of connection establishment.

In some examples, rating module 410 may send the ratings to packet module 205. Packet module 205 may monitor every packet of an unreliable connection (i.e., a connection with lower rating). In some examples, packet module 205 may only monitor the first packet of a reliable connection (i.e., connection with a higher rating), In some embodiments, rating module 410 may tag a connection as reliable or unreliable.

In some embodiments, connection module 415 may be configured to terminate a connection based at least in part on detecting suspicious network activity. In some examples, connection module 415 may receive an indication of suspicious network traffic from origin module 405. Upon receiving the indication, connection module 415 may be configured to immediately terminate the established connection. In some examples, connection module 415 may not terminate the established connection, and may monitor for a termination of the connection. For example, connection module 415 may monitor when there is no connection between a server and a client. In some examples, connection module 415 may monitor for a TCP connection termination request. Upon detecting termination of an established connection, connection module 415 may store data from the network traffic associated with the suspicious connection. In some examples, connection module 415 may store the data to a storage drive. In some examples, connection module 415 may store every packet exchanged between a server and a client, during the connection. In some embodiments, the stored data may be manually analyzed.

Figure 5:
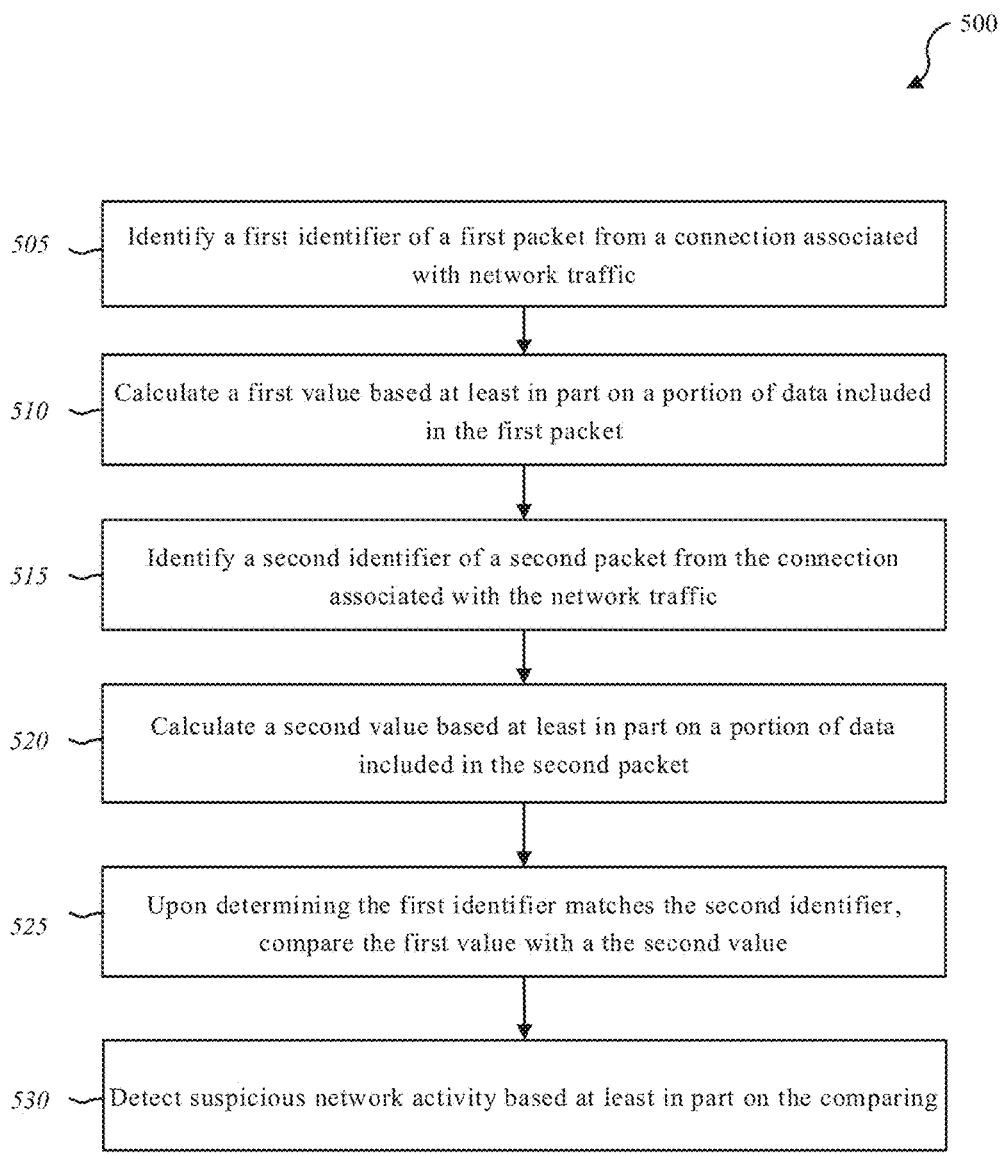
FIG. 5 is a flow diagram illustrating one embodiment of a method in accordance with various aspects of this disclosure.

FIG. 5 is a flow diagram illustrating one embodiment of a method 500 for detecting network packet injection. In some configurations, the method 500 may be implemented by the packet injection detection module 145 illustrated in FIGS. 1, 2, 3, and/or 4. In some configurations, the method 500 may be implemented in conjunction with device 105, server 110, network 115, database 120, components thereof, or any combination thereof.

At block 505, method 500 may include identifying a first identifier of a first packet from a connection associated with network traffic. At block 510, method 500 may include calculating a first value based at least in part on a portion of data included in the first packet. At block 515, method 500 may include identifying a second identifier of a second packet from the connection associated with the network traffic. At block 520, method 500 may include calculating a second value based at least in part on a portion of data included in the second packet. At block 525, upon determining the first identifier matches the second identifier, method 500 may include comparing the first value with a the second value. At block 530, method 500 may include detecting suspicious network activity based at least in part on the comparing.

Figure 6:
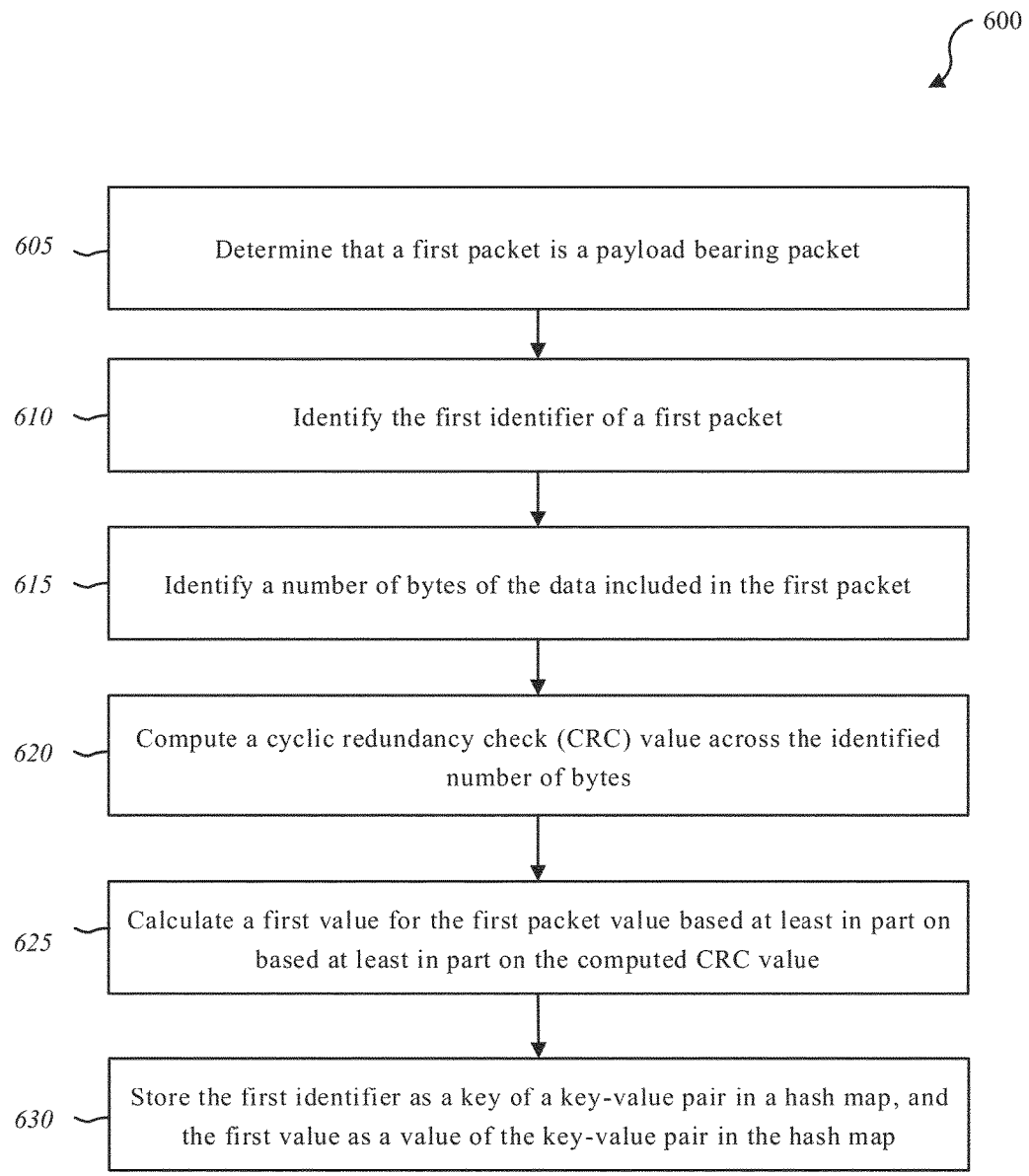
FIG. 6 is a flow diagram illustrating one embodiment of a method in accordance with various aspects of this disclosure.

FIG. 6 is a flow diagram illustrating one embodiment of a method 600 for detecting network packet injection. In some configurations, the method 600 may be implemented by the packet injection detection module 145 illustrated in FIGS. 1, 2, 3, and/or 4. In some configurations, the method 600 may be implemented in conjunction with device 105, server 110, network 115, database 120, components thereof, or any combination thereof.

At block 605, method 600 may include determining that a first packet is a payload bearing packet. At block 610, method 600 may include identifying the first identifier of a first packet. The first identifier may include at least one of a sequence number and an acknowledgement number associated with the first packet. At block 615, method 600 may include identifying a number of bytes of the data included in the first packet. At block 620, method 600 may include computing a CRC value across the identified number of bytes. At block 625, method 600 may include calculating a first value for the first packet value based at least in part on based at least in part on the computed CRC value. At block 630, method 600 may include storing the first identifier as a key of a key-value pair in a hash map, and the first value as a value of the key-value pair in the hash map.

Figure 7:
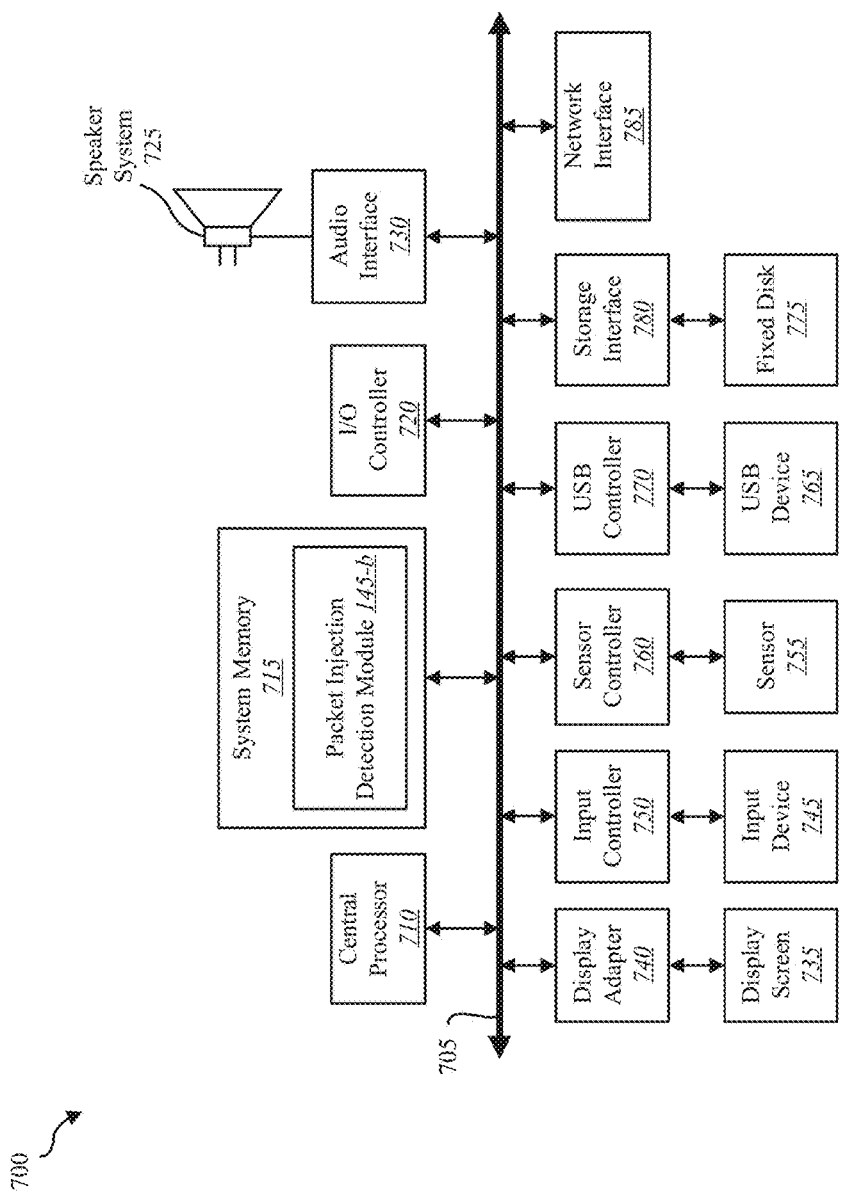
FIG. 7 depicts a block diagram of a computer system suitable for implementing the present systems and methods.

FIG. 7 depicts a block diagram of a computing device 700 suitable for implementing the present systems and methods. The device 700 may be an example of device 105, computing device 150, and/or server 110 illustrated in FIG. 1. In one configuration, device 700 includes a bus 705 which interconnects major subsystems of device 700, such as a central processor 710, a system memory 715 (typically RAM, but which may also include ROM, flash RAM, or the like), an input/output controller 720, an external audio device, such as a speaker system 725 via an audio output interface 730, an external device, such as a display screen 735 via display adapter 740, an input device 745 (e.g., remote control device interfaced with an input controller 750), multiple USB devices 765 (interfaced with a USB controller 770), and a storage interface 780. Also included are at least one sensor 755 connected to bus 705 through a sensor controller 760 and a network interface 785 (coupled directly to bus 705).

Bus 705 allows data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the packet injection detection module 145-*c* to implement the present systems and methods may be stored within the system memory 715. Applications (e.g., application 140) resident with device 700 are generally stored on and accessed via a non-transitory computer readable medium, such as a hard disk drive (e.g., fixed disk 775) or other storage medium. Additionally, applications can be in the form of electronic signals modulated in accordance with the application and data communication technology when accessed via interface 785.

Storage interface 780, as with the other storage interfaces of device 700, can connect to a standard computer readable medium for storage and/or retrieval of information, such as a fixed disk drive 775. Fixed disk drive 775 may be a part of device 700 or may be separate and accessed through other interface systems. Network interface 785 may provide a direct connection to a remote server via a direct network link to the Internet via a POP (point of presence). Network interface 785 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 700 wirelessly via network interface 785.

Many other devices and/or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 7 need not be present to practice the present systems and methods. The devices and subsystems can be interconnected in different ways from that shown in FIG. 7. The aspect of some operations of a system such as that shown in FIG. 7 are readily known in the art and are not discussed in detail in this application. Code to implement the present disclosure can be stored in a non-transitory computer-readable medium such as one or more of system memory 715 or fixed disk 775. The operating system provided on device 700 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with system 700 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network interface 785 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

The I/O controller 720 may operate in conjunction with network interface 785 and/or storage interface 780. The network interface 785 may enable system 700 with the ability to communicate with client devices (e.g., device 105 of FIG. 1), and/or other devices over the network 115 of FIG. 1. Network interface 785 may provide wired and/or wireless network connections. In some cases, network interface 785 may include an Ethernet adapter or Fiber Channel adapter. Storage interface 780 may enable system 700 to access one or more data storage devices. The one or more data storage devices may include two or more data tiers each. The storage interface 780 may include one or more of an Ethernet adapter, a Fiber Channel adapter, Fiber Channel Protocol (FCP) adapter, a SCSI adapter, and iSCSI protocol adapter.

Figure 8:
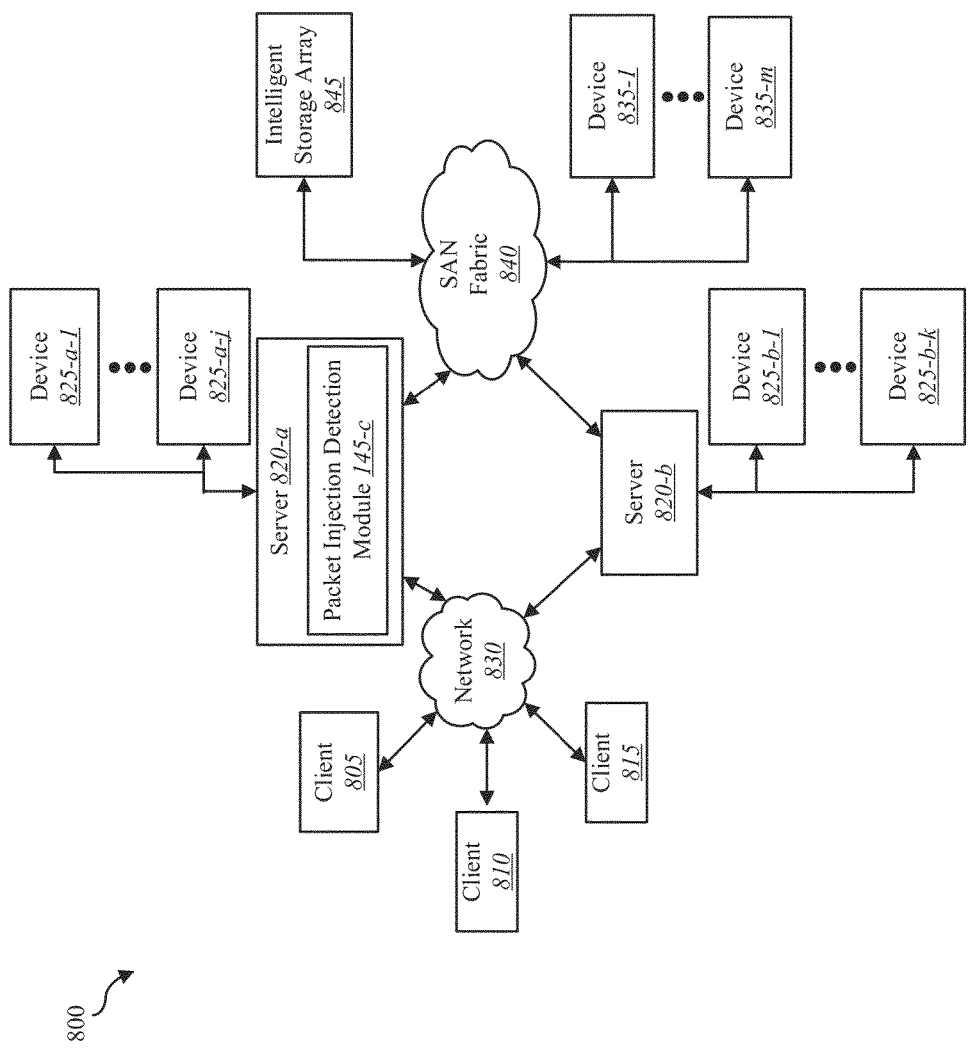
FIG. 8 depicts a block diagram of a computer system suitable for implementing the present systems and methods.

FIG. 8 is a block diagram depicting a network architecture 800 in which client systems 805, 810 and 815, as well as storage servers 820-a and 820-b (any of which can be implemented using computer system 700), are coupled to a network 830. In one embodiment, packet injection detection module 145-d may be located within one of the storage servers 820-a, 820-b to implement the present systems and methods. Packet injection detection module 145-d may be one example of packet injection detection module 145 depicted in FIGS. 1, 2, 3, 4, and/or 7. The storage server 820-a is further depicted as having storage devices 825-a-1 through 825-a-j directly attached, and storage server 820-b is depicted with storage devices 825-b-1 through 825-b-k directly attached. SAN fabric 840 supports access to storage devices 835-l through 835-m by storage servers 820-a and 820-b, and so by client systems 805, 810 and 815 via network 830. Intelligent storage array 845 is also shown as an example of a specific storage device accessible via SAN fabric 840.

With reference to computer system 700, network interface 785 or some other method can be used to provide connectivity from each of client computer systems 805, 810 and 815 to network 830. Client systems 805, 810 and 815 are able to access information on storage server 820-a or 820-b using, for example, a web browser or other client software (not shown). Such a client allows client systems 805, 810 and 815 to access data hosted by storage server 820-a or 820-b or one of storage devices 825-a-1 to 825-a-j, 825-b-1 to 825-b-k, 835-l to 835-m or intelligent storage array 845. FIG. 8 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining a packet injection. For example, types of security actions may include preventing the packet from performing any actions on the computing device, alerting an administrator to the potential maliciousness of the connection, quarantine a file related to the connection, delete the file, block a download of the file, and/or warn a user about the connection. In addition, the systems described herein may perform a security action on objects other than a file. For example, the systems described herein may blacklist malicious URLs and/or IP addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A method for preventing suspicious activity on a computer network, comprising:
   determining, via one or more processors, a first identifier of a first packet from a connection associated with network traffic, wherein the first packet is a payload bearing packet;
   calculating, via the one or more processors, a first value based at least in part on a payload portion included in the first packet;
   determining, via the one or more processors, a second identifier of a second packet from the connection associated with the network traffic, wherein the second packet is a second payload bearing packet;
   determining that the second identifier matches the first identifier based at least in part on a hash map associated with the connection;
   calculating, via the one or more processors, a second value based at least in part on a payload portion included in the second packet;
   comparing, via the one or more processors, the first value with the second value;
   determining, via the one or more processors, that suspicious activity is occurring on the network based at least in part on the comparison between the first and second values; and
   terminating, via the one or more processors, the connection based at least in part on determining that the second identifier matches the first identifier, and the first value and the second value do not match.

2. The method of claim 1, wherein the first identifier includes at least one of a sequence number and an acknowledgement number associated with the first packet.

3. The method of claim 1, further comprising:
   determining that the first packet and the second packet are payload bearing packets based at least in part on the hash map associated with the connection;
   identifying a number of bytes of the payload portion included in the first packet; and
   computing a cyclic redundancy check (CRC) value across the identified number of bytes, wherein the first value is based at least in part on the computed CRC value.

4. The method of claim 3, wherein the first identifier and the first value are identified based at least in part on the hash map.

5. The method of claim 4, wherein the first identifier is stored as a key of a key-value pair in the hash map, and the first value is stored as a value of the key-value pair in the hash map.

6. The method of claim 1, wherein the comparing further comprises:
   detecting the suspicious network activity based at least in part on determining that the first identifier and the second identifier match, and the first value and the second value do not match.

7. The method of claim 1, further comprising:
   identifying an origin associated with the suspicious network traffic; and
   adjusting a rating associated with the identified origin based at least in part on the detecting.

8. The method of claim 1, wherein the network traffic includes at least one of packet flows between one or more devices of an intranet, packet flows between one or more devices of the Internet, or any combination thereof.

9. The method of claim 1, wherein the first packet and/or the second packet include at least one of a transmission control protocol (TCP) packet, internet protocol (IP) packet, internet control message protocol (ICMP) packet, user datagram protocol (UDP) packet, or any combination thereof.

10. The method of claim 1, further comprising:
    performing a security action based at least in part on detecting the suspicious network activity.

11. The method of claim 10, wherein performing the security action further comprising:

terminating the connection based at least in part on detecting the suspicious network activity.

12. The method of claim 10, wherein performing the security action further comprising:
    detecting a termination of the connection associated with the suspicious network activity; and
    upon detecting the termination, storing to a storage drive data from the network traffic associated with the connection.

13. A computing device for preventing suspicious activity on a computer network, comprising:
    one or more processors;
    non-transitory memory in electronic communication with the one or more processors, wherein the non-transitory memory stores computer executable instructions that when executed by the one or more processors cause the one or more processors to perform the steps of:
        determine a first identifier of a first packet from a connection associated with network traffic, wherein the first packet is a payload bearing packet;
        calculate a first value based at least in part on a payload portion included in the first packet;
        determine a second identifier of a second packet from the connection associated with the network traffic, wherein the second packet is a second payload bearing packet;
        determine that the second identifier matches the first identifier based at least in part on a hash map associated with the connection;
        calculate a second value based at least in part on a payload portion included in the second packet;
        compare the first value with the second value;
        determine that suspicious activity is occurring on the network based at least in part on the comparison between the first and second values; and
        terminate the connection based at least in part on determining that the second identifier matches the first identifier, and the first value and the second value do not match.

14. The computing device of claim 12, wherein the first identifier includes at least one of a sequence number and an acknowledgement number associated with the first packet.

15. The computing device of claim 12, wherein the instructions executed by the one or more processors cause the one or more processors to perform the steps of:
    determine that the first packet and the second packet are payload bearing packets based at least in part on the hash map associated with the connection;
    identify a number of bytes of the payload portion included in the first packet; and
    compute a cyclic redundancy check (CRC) value across the identified number of bytes, wherein the first value is based at least in part on the computed CRC value.

16. The computing device of claim 15, wherein the first identifier and the first value are identified based at least in part on the hash map.

17. The computing device of claim 16, wherein the first identifier is stored as a key of a key-value pair in the hash map, and the first value is stored as a value of the key-value pair in the hash map.

18. A non-transitory computer-readable storage medium storing computer executable instructions that when executed by one or more processors cause the one or more processors to perform the steps of:
    determine a first identifier of a first packet from a connection associated with network traffic, wherein the first packet is a payload bearing packet;
    calculate a first value based at least in part on a payload portion included in the first packet;
    determine a second identifier of a second packet from the connection associated with the network traffic, wherein the second packet is a second payload bearing packet;
    determine that the second identifier matches the first identifier based at least in part on a hash map associated with the connection;
    calculate a second value based at least in part on a payload portion included in the second packet;
    compare the first value with the second value;
    determine that suspicious activity is occurring on the network based at least in part on the comparison between the first and second values; and
    terminate the connection based at least in part on determining that the second identifier matches the first identifier, and the first value and the second value do not match.

19. The computer-program product of claim 18, wherein the first identifier includes at least one of a sequence number and an acknowledgement number associated with the first packet.

20. The computer-program product of claim 18, wherein the instructions executed by the one or more processors cause the one or more processors to perform the steps of:
    determine that the first packet and the second packet are payload bearing packets based at least in part on the hash map associated with the connection;
    identify a number of bytes of the payload portion included in the first packet; and
    compute a cyclic redundancy check (CRC) value across the identified number of bytes, wherein the first value is based at least in part on the computed CRC value.

* * * * *